(12) United States Patent
Désor

(10) Patent No.: US 6,324,196 B1
(45) Date of Patent: Nov. 27, 2001

(54) DIAGNOSIS OF THE TRIGGER CHAIN OF A PULSED LASER

(75) Inventor: Rainer Désor, Bovenden (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/481,918

(22) Filed: Jan. 12, 2000

Related U.S. Application Data

(60) Provisional application No. 60/124,784, filed on Mar. 17, 1999.

(51) Int. Cl.$^7$ ........................................ H01S 3/13
(52) U.S. Cl. ........................ 372/30; 372/25; 372/29.02
(58) Field of Search ............................... 372/29.02, 30.25

Primary Examiner—Leon Scott, Jr.
(74) Attorney, Agent, or Firm—Sierra Patent Group, Ltd.; Andrew V. Smith

(57) ABSTRACT

A diagnostic system is disclosed for monitoring the operation of an excimer laser. A typical excimer laser generates a light pulse in response to a trigger signal. The trigger signal propagates from an external source through a number of electrical modules to the gas discharge. In accordance with the subject invention, outputs from each of the various modules are supplied to digital counters. When the laser is operating properly, each counter will record a single count for each trigger signal. When a fault occurs, the number of counts counted by the counter connected to the faulty module will not match the number of trigger signals. The service engineer can use the information in the counters to help identify which module in the trigger chain is experiencing problems.

9 Claims, 4 Drawing Sheets

DIAGNOSIS OF THE TRIGGER CHAIN OF A PULSED LASER

PRIORITY

This application claims the benefit of priority to U.S. Provisional Patent Application No. 60/124,784, filed Mar. 17, 1999.

FIELD OF THE INVENTION

The present invention relates to an improved diagnostic system for use with an industrial excimer laser. The diagnostic system allows a service engineer to automatically check the function of the different modules in the trigger chain of a pulsed laser and more easily determine which module is not operating properly. The subject system operates by monitoring pulses generated by each module in the trigger chain.

BACKGROUND OF THE INVENTION

Excimer lasers, that are currently widely used in the semiconductor industry for lithography applications, arc pulsed, transversal, excited gas discharge lasers. The major interest of this industry is the reliability, uptime, and mean time to repair (MTTR) the laser system. If a failure occurs, it must be repaired quickly. Accordingly, diagnosis of a failure in the laser system has to be performed in a short time and the defective part of the system has to be identified and repaired or replaced immediately.

For a pulsed laser, the generation of the light energy, from an externally applied trigger pulse to the ultimate light pulse is critical. Particularly in lithography, it is very important that one light pulse is generated for each trigger pulse. In operation, sometimes more or less output pulses will be generated for each trigger pulse. In the past, when a failure occurred, a service person was required to manually analyze each part of the trigger chain. This analysis was strongly dependent on the experience and knowledge of the service engineer. Usually the engineer checked the input and output of each module to trace where the fault occurred. This process is quite time consuming and difficult. Therefore, it is desirable to have an automated system that can check for faults in the trigger chain of a pulsed laser and report where the fault is located in order to reduce the down time of the laser.

SUMMARY OF THE INVENTION

The object of the present diagnostic system is to help detect in which module a fault has occurred in the trigger chain of a pulsed laser system. This result is achieved by associating each module in the chain with a digital counter, which counts the pulses produced by that module. If the system is operating normally, the counts in each of the counters should be the same. Any deviation in the total counts recorded by each counter is evidence of a problem. If a problem exists, the service engineer will identify the earliest counter in the train where the deviation occurred. This counter will likely correspond to the module where the problem is located. This approach allows the engineer to more easily identify the faulty module without manually checking each module individually.

In the preferred embodiment, a controller computes the difference between the values in each counter and a master counter and then stores the results. If all the modules are operating properly, the difference values will all be zero. Any non-zero value is indicative of a problem.

DETAILED DESCRIPTION OF THE PREFERRED EMBODIMENT

Figure 1:
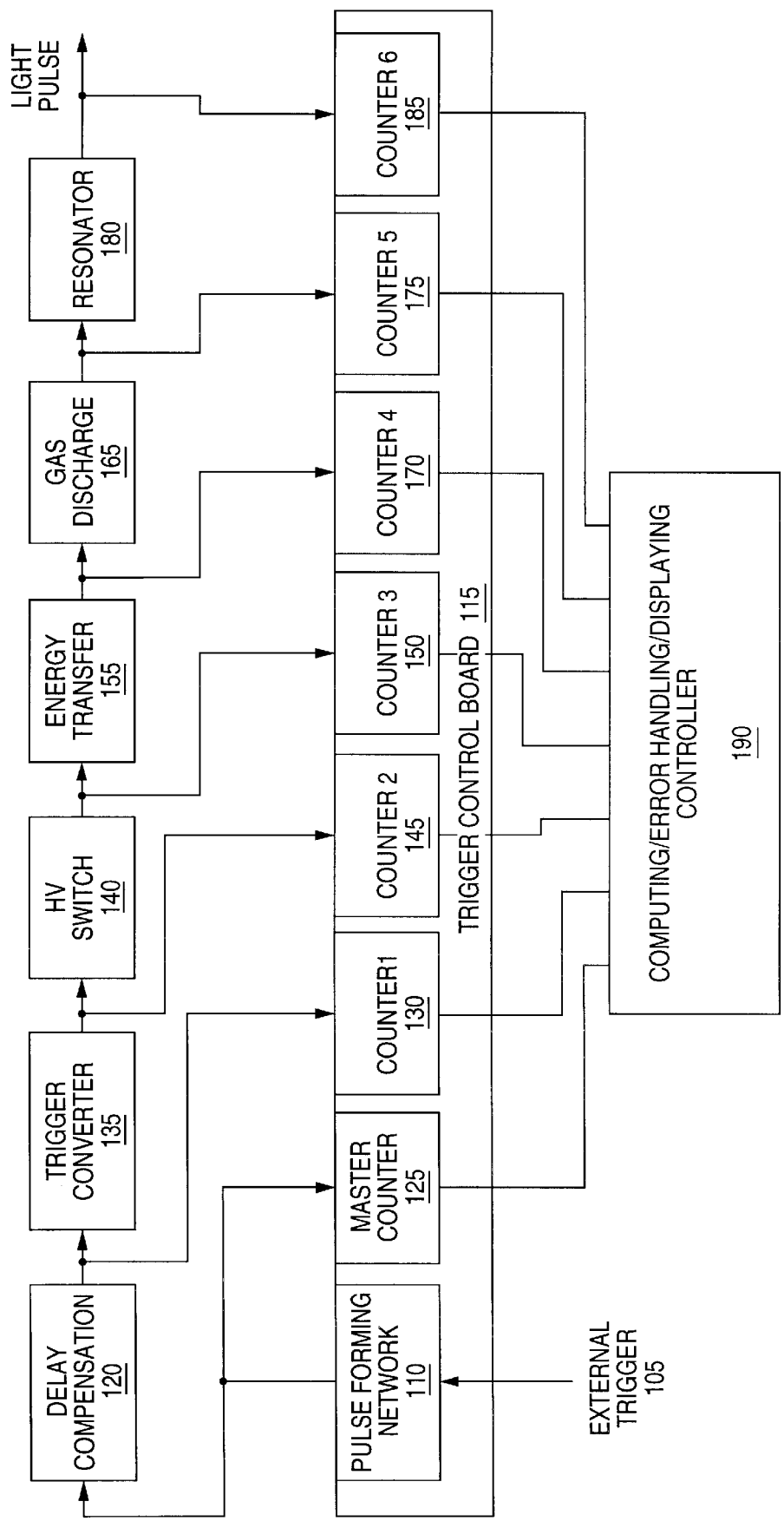
FIG. 1 is a schematic diagram of a first embodiment of the diagnostic system of the subject invention.

Referring to FIG. 1, a first embodiment of the present invention is shown. Boxes 110, 120, 135, 140, 155, 165, and 180, represent modules found in a conventional excimer laser for generating an output laser pulse. In a conventional system, an external trigger signal 105 is applied to a pulse-forming network 110. The pulse-forming network functions to shape the trigger pulse into a form suitable for the laser electronics. The pulse-forming network includes a means to protect the input circuitry against excessive voltage amplitudes as well as a means to limit the applied trigger frequency to the maximum allowed frequency of the laser system. Such mean could be a gate signal with the width equal to 1/maximum frequency which blocks any trigger pulse which occurs inside the gate signal.

The output of the pulse-forming network 110 is supplied to a delay compensation module 120. The delay compensation module 120 functions to compensate for variations in the delay between the external trigger signal and the light pulse. This delay varies in response to changes in the charging voltage (which directly effects the time delay inherent in magnetic switches, compressors and inductors in the system). Delay compensation is described in more detail in commonly owned German Patent DE 384292.

The output of the delay compensation module 120 is supplied to a trigger converter 135 via a light fiber signal. The trigger converter 135 in turn supplies the signal necessary to fire the semiconductor high-voltage switch 140, which is typically a thyristor or IGBT. Once the switch 140 is fired, the signal propagates to the energy transfer module 155. Energy transfer module includes pulse transformers and compressors for increasing the voltage of the pulse and shortening the pulse. The final energy pulse is then delivered to the gas discharge 165 of the laser through peaking capacitors. Once the gas is excited, it will generate a laser output pulses from the resonator 180.

If all systems are operating properly, there should be one output laser pulse generated for each input (trigger) pulse. Further, each module in the chain should generate one pulse for each trigger pulse. If the laser is not operating properly, the modules will generate either more or less pulses for each trigger pulse. The subject invention is intended to help identify where in the chain the problem of this type is occurring.

To achieve this goal, a plurality of digital counters are provided, each of which are connected to the output of one of the modules. As seen in FIG. 1, a master counter 125 is electrically connected to the output of the pulse-forming network 105. The master counter records a pulse for each pulse generated by the pulse-forming network. Counter 130 is electrically connected to the output of the delay compensation module 120 and likewise counts pulses generated by this module. The light fiber signal generated by trigger converter 135 is supplied to counter 145. The output of the high-voltage switch module 140 is connected via a light fiber to counter 150. The output of the energy transfer module 155 is connected via a light fiber to counter 170. Note that an energy transfer module typically has multiple stages. The outputs of each of these stages could be coupled to separate counters (not shown).

Energy stored in the peaking capacitors is dissipated as soon as the break down voltage of the gas discharge is reached. At this moment, a high current will flow through the capacitor. A current probe detects this current and, via an electric pulse to light pulse conversion, supplies a signal to counter 175.

The laser is equipped with an energy monitor which measures the energy of each light pulse. The main part of this energy monitor is situated in a controller. The monitor is triggered by every light pulse and is equipped with a TTL pulse BNC output which is directly connected to counter 185.

An alternative method to detect a light pulse is to convert the invisible light, which can not be transmitted through standard light fiber, into the visible range by using a Cesium doped quartz plate. A connected light fiber can transmit this converted light, which is converted by a standard receiver, into an electrical signal. This method is useful whenever a synchronization with low jitter (+/-1 nanosecond) with respect to the light pulse is needed.

The output of each counter is supplied to controller 190. If each of the modules generates one pulse in response to a single output pulse from the pulse-forming network 110, the numbers in each of the counters will be the same. In contrast, if one of the modules is not operating properly (generating either too many or too few pulses), the number of counts in the counters downstream from the problem module will register a different number of pulses compared to the master counter. By looking at the first counter in the chain whose count number does not match the master counter, the service engineer can identify the module most likely to be the cause of the problem.

In order to avoid the need to compare large count numbers, in the preferred embodiment of the subject invention, the controller 190 functions to subtract the number of pulses in each of the counters from the pulses counted by the master counter 125. If all the modules are operating properly, the "difference" associated with each of the counters 130, 145, 150, 170, 175 and 185 would be zero. If any of the associated modules was operating incorrectly, (generating either too many or too few pulses) the calculated "difference" would be a small positive or negative number. A positive difference would indicate additional pulses are being generated from a defective module, while a negative difference would indicate less pulses are being generated from the defective module. Another advantage of calculating the differences between counters is that less memory is needed to store the count information. In particular, these lasers can be operated in excess of a kilohertz pulse rate, so tracking pulse totals over a period of seconds or minutes would require large number values to be stored.

All the digital counters may be mounted on the trigger pulse conversion board. As noted above, pulses from each module are transferred to the digital counters by either an electrical connection or a light fiber connection. Light fiber connections are preferable if the module produces EMI noise or is located in an area where EMI noise is produced.

In the preferred embodiment, controller 190 operates to automatically track whether there are any differences between the counts in the master counter and the remaining counters. If a difference develops, the operator is signaled that a failure is occurring. This is extremely important in lithography applications where the pulse output must be accurate.

Figure 2:
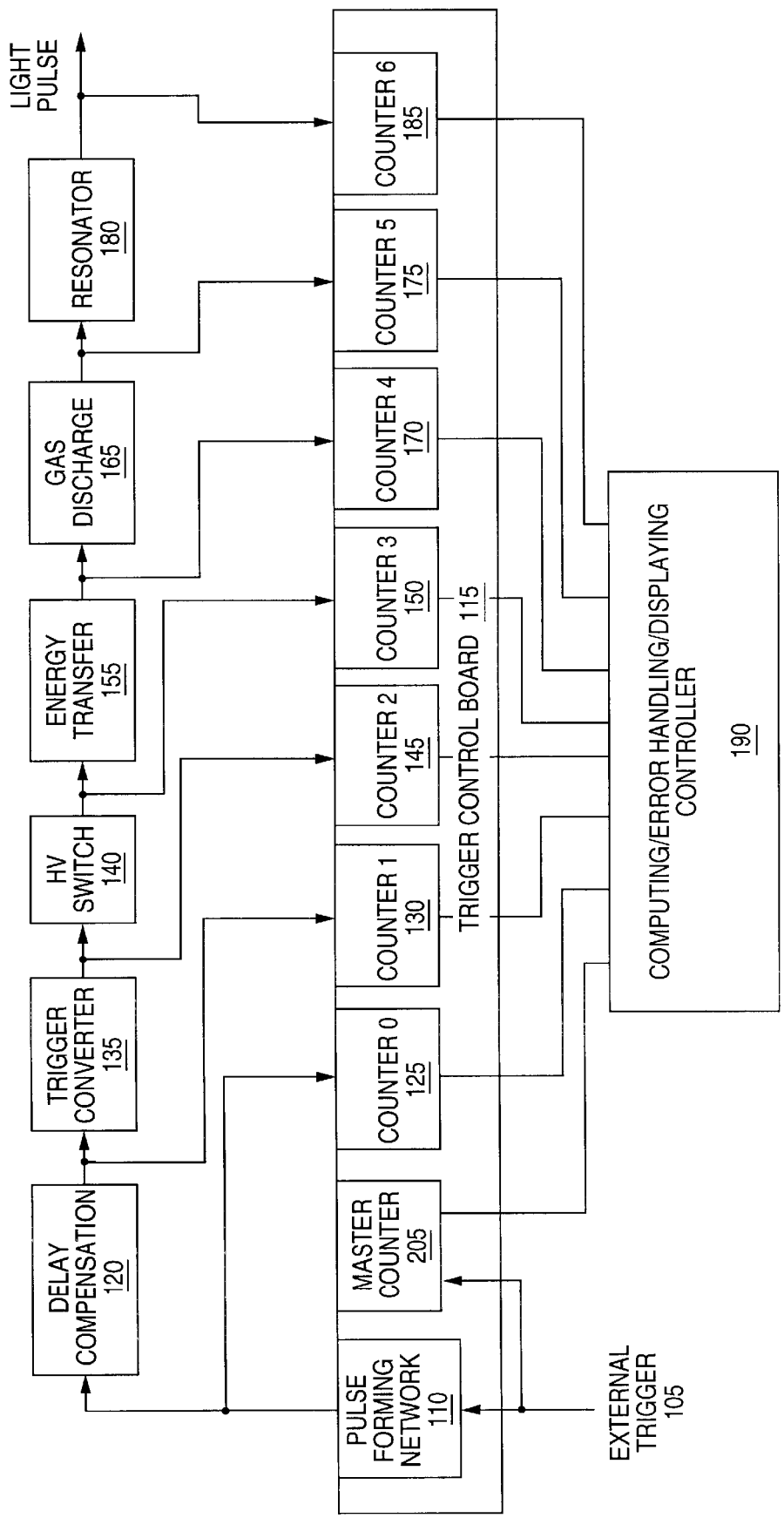
FIG. 2 is a schematic diagram of a second embodiment of the diagnostic system with an additional counter 205 to be used when a check of the pulse-forming network stage is required.

In some cases, it may be desirable to monitor the operation of the pulse-forming network. In this case, an extra counter can be added to directly receive the trigger signal. This arrangement is shown in FIG. 2. The only difference between FIG. 1 and FIG. 2 is that the master counter 205 receives a direct input from the external trigger 105. The output of the pulse-forming network is then supplied to counter 125 as before. As can be appreciated, in this embodiment, a difference between the count in counter 205 and the count in counter 125 would be an indication that the pulse-forming network was not operating properly and that the laser system was triggered with a frequency above the allowed maximum.

Figure 3:
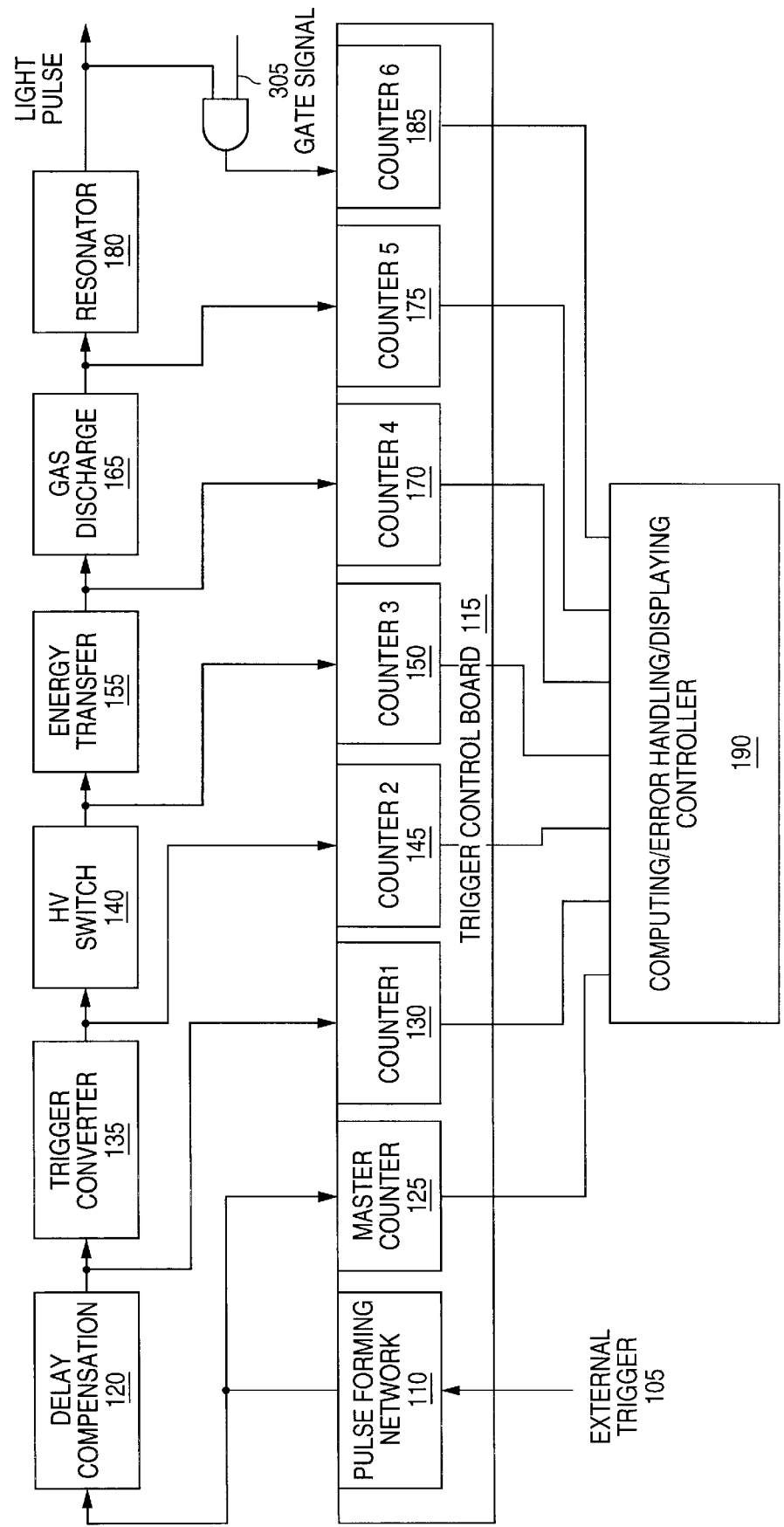
FIG. 3 is a schematic diagram of a third embodiment of the subject invention which includes the use of a gate signal generator to limit the counting of pulses exiting the resonator to pulses falling within a specified (proper) time period.

FIG. 3 illustrates a third embodiment of the subject invention which includes an additional monitoring function related to the laser pulses emitted from the laser resonator. More particularly, in lithography applications, it is important to know not only that a laser pulse was generated in response to each trigger pulse, but in addition, that the output laser pulse was generated within a proper narrow time window. For example, the delay between the external trigger and the laser light pulses may be specified for a certain application within 50 microseconds +/-100 nanoseconds. When the light pulse in relation to the external trigger is out of this a range, the wafer will be exposed at a wrong position, since the wafer stage moves synchronously with the external trigger pulses. FIG. 3 illustrates an embodiment where this monitoring can be achieved.

Figure 4:
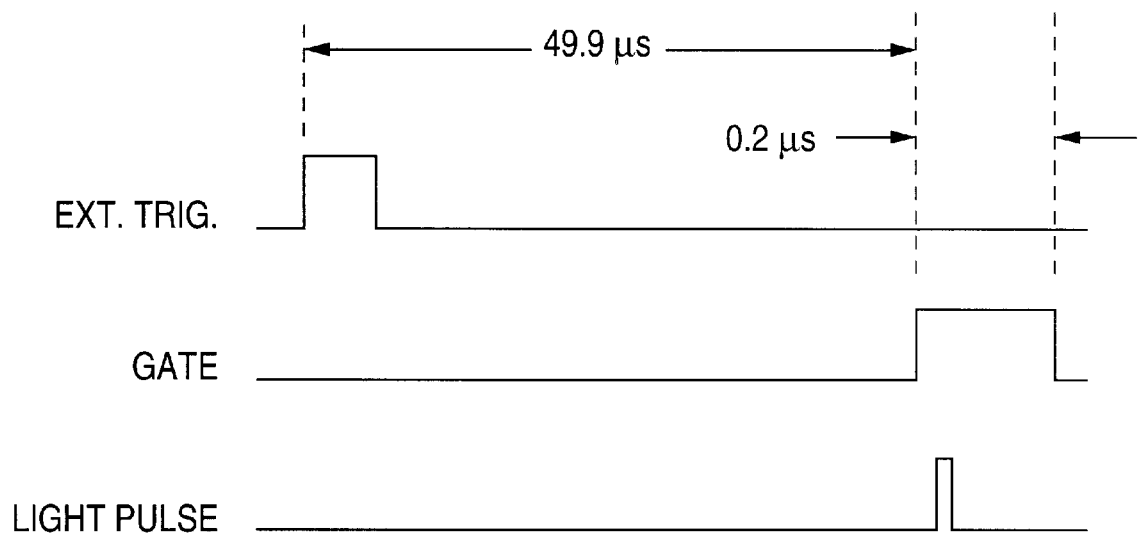
FIG. 4 is a timing diagram of the gate signal used in FIG. 3.

In FIG. 3, the output from the monitor which measures the laser pulse output from the resonator is supplied to an AND gate. The second input to the AND gate comes from the controller as illustrated in FIG. 4. This gate signal is low from the initiation of the trigger signal until a period sometime later, in this example, 49.9 microseconds. At this point, the gate signal goes high for 0.2 microseconds. If the light pulse from the resonator is generated in the narrow 0.2 microsecond window when the gate signal is high, the AND gate will generate a high signal and reach counter 185. If the resonator emits a light pulse in response to the trigger signal at a time when the gate signal is a low (either early or late) counter 185 will record no count and the laser pulse will be recognized as a missing pulse.

Various other modifications and alterations in the structure and use of this invention will be apparent to those skilled in the art without departing from the scope and spirit of the invention. Although the invention has been described in connection with the specific preferred embodiments, it should be understood that the invention as claimed should not be unduly limited to any specific embodiment. It is intended that the following claims define the scope of the present invention and that structures and methods within the scope of these claims and their equivalents are covered thereby.

What is claimed is:

1. In a laser having a resonator surrounding a gas discharge which is excited by electrical current pulses to generate pulses of laser light, said current pulses being generated in response to a trigger signal which initiates the operation of a plurality of electrical modules that generate the electric current pulses, a system for monitoring the performance of the individual electrical modules comprising;

a plurality of counters connected to outputs of individual ones of said plurality of electrical modules, said counters generating count signals corresponding to the electrical current pulses in response to the outputs of the associated electrical modules; and a processor for recording the count signals generated by each of the counters and for determining with which of he plurality of electrical modules that a fault is associated based on differences between the count signals of the respective counters.

2. A system as recited in claim 1 wherein the first counter in the chain is the master counter and the remainder of the counters are secondary counters and wherein the processor computes the difference in counts measured by the master counter and the respective secondary counters.

3. A system as recited in claim 2 wherein said master counter counts trigger signals.

4. A system as recited in claim 2 wherein said master counter counts the output from an electrical module and the secondary counters count the output from the electrical modules downstream in the chain.

5. A system as recited in claim 1 further including a monitor for generating an output signal in response to laser pulses emitted from the laser resonator and wherein the output signal is provided to a laser pulse counter so that the operational problems related to the laser resonator can be identified.

6. A system as recited in claim 5 wherein the laser pulse counter is controlled to count only those pulses which fall within a specified time window.

7. A system as recited in claim 6 further including a gate between the monitor for generating the output signals in response to the laser pulses and the laser pulse counter and wherein the operation of the laser pulse counter is in part controlled by a gate signal supplied to the gate.

8. A method of operating a laser having a resonator surrounding a gas discharge which is excited by electrical current pulses to generate pulses of laser light, said current pulses being generated in response to a trigger signal which initiates the operation of a plurality of electrical modules that generate the electric current pulses, said method for monitoring the performance of the individual electrical modules and comprising the steps of:

monitoring outputs of individual ones of said plurality of electrical modules, and generating count signals corresponding to the electrical current pulses in response thereto; and recording the count signals; and determining with which of the plurality of electrical modules that a fault is associated based on differences between the number of the counts recorded for different electrical modules.

9. A method as recited in claim 8 further including the step of calculating and storing the difference in counts associated with selected modules.

* * * * *